(12) United States Patent
Weinberg

(10) Patent No.: US 7,976,884 B2
(45) Date of Patent: Jul. 12, 2011

(54) EDIBLE ANIMAL CHEW TOY

(75) Inventor: Christopher Alan Weinberg, Reno, NV (US)

(73) Assignee: Nestec Ltd., Vevey (CH)

( * ) Notice: Subject to any disclaimer, the term of this patent is extended or adjusted under 35 U.S.C. 154(b) by 366 days.

(21) Appl. No.: 12/206,149

(22) Filed: Sep. 8, 2008

(65) Prior Publication Data

US 2009/0004328 A1    Jan. 1, 2009

Related U.S. Application Data

(63) Continuation-in-part of application No. 10/781,201, filed on Feb. 17, 2004, now abandoned.

(60) Provisional application No. 60/491,880, filed on Aug. 1, 2003.

(51) Int. Cl.
*A01K 29/00* (2006.01)

(52) U.S. Cl. ........ 426/282; 426/132; 426/656; 426/805; 426/106

(58) Field of Classification Search .................. 426/132, 426/282, 106, 656, 805; D1/199, 160
See application file for complete search history.

(56) References Cited

U.S. PATENT DOCUMENTS

| | | |
|---|---|---|
| 2,988,045 A | 6/1961 | Fisher |
| 3,808,340 A | 4/1974 | Palmer |
| 3,899,607 A | 8/1975 | Miller |
| 4,260,635 A | 4/1981 | Fisher |
| 5,011,679 A | 4/1991 | Spanier et al. |
| 5,149,550 A * | 9/1992 | Mohilef .............................. 426/3 |
| 5,339,771 A | 8/1994 | Axelrod |
| 5,476,069 A | 12/1995 | Axelrod |
| 5,635,237 A | 6/1997 | Greenberg et al. |
| 5,673,653 A | 10/1997 | Sherrill |
| 5,897,893 A | 4/1999 | Mohilef |
| 5,922,692 A | 7/1999 | Marino |
| 6,033,715 A | 3/2000 | Lynch |
| 6,165,474 A | 12/2000 | Frudakis et al. |
| 6,223,693 B1 | 5/2001 | Perlberg et al. |
| 6,238,715 B1 | 5/2001 | Baikie |
| 6,238,726 B1 | 5/2001 | Fischer |
| 6,277,420 B1 | 8/2001 | Andersen et al. |
| 6,365,133 B1 | 4/2002 | Rich |
| 6,444,243 B1 | 9/2002 | Duensing et al. |
| D476,118 S | 6/2003 | Kirch |
| 6,584,938 B2 | 7/2003 | Sherrill et al. |
| 6,799,536 B1 | 10/2004 | Jia et al. |
| 6,827,041 B2 | 12/2004 | Hague et al. |
| 6,840,196 B2 | 1/2005 | Kirch |
| D503,506 S * | 4/2005 | Tepper et al. .................. D1/101 |
| D505,533 S * | 5/2005 | Jia et al. ......................... D1/199 |
| 6,886,496 B1 | 5/2005 | Brown |
| 6,886,497 B1 | 5/2005 | Hague |
| 6,895,900 B2 | 5/2005 | Hingst |
| 7,025,020 B2 | 4/2006 | Brown |
| 7,205,015 B2 | 4/2007 | Shu |

(Continued)

OTHER PUBLICATIONS

Pet Product News, Feb. 2002, New Product Gallery Filled Rawhide Treats, vol. 56, No. 2, Fancy Publications, Inc., Mission Viejo, CA., USA. p. 66.

(Continued)

*Primary Examiner* — C. Sayala
(74) *Attorney, Agent, or Firm* — Michael Blaine Brooks P.C.

(57) ABSTRACT

An edible pet chew that is made of rehydrated hide about an inner fill via a positioning shealth.

2 Claims, 17 Drawing Sheets

U.S. PATENT DOCUMENTS

| | | | | |
|---|---|---|---|---|
| 7,579,038 B1 * | 8/2009 | Weinberg | ................... | 426/656 |
| 7,678,402 B1 * | 3/2010 | Marino | ................... | 426/518 |
| 2002/0142079 A1 | 10/2002 | Chong | | |
| 2003/0215547 A1 | 11/2003 | Leyh, Jr. | | |
| 2005/0037108 A1 | 2/2005 | Lin et al. | | |
| 2005/0139167 A1 | 6/2005 | Leo | | |

OTHER PUBLICATIONS

Pet Product News, Red Barn Premium Pet Products Advertisement, Aug. 2002, vol. 56, No. 8, Fancy Publications, Inc., Mission Viejo, CA., USA, p. 37.

Filled Rolled Rawhide,[online],retrieved on May 11, 2006 from Red Barn Pet Products website using Internet <URL:http://www.redbarninc.com/pc-59-17-filled-rolled-rawhide.aspx>.

Filled Rolled Rawhide image,[online],retrieved on May 11, 2006 from Red Barn Pet Products website using Internet <URL:http://www.redbarninc.com/images/product/large/59.gif>.

Non-Final Office action mailed Jun. 28, 2006 for U.S. Appl. No. 11/307,477.

Final Office action mailed Oct. 12, 2006 for U.S. Appl. No. 11/307,477.

Non-Final Office action mailed Sep. 27, 2007 for U.S. Appl. No. 11/161,007.

Non-Final Office action mailed Mar. 17, 2008 for U.S. Appl. No. 10/781,201.

* cited by examiner

EDIBLE ANIMAL CHEW TOY

CROSS-REFERENCE TO RELATED APPLICATION

This application is a Continuation-In-Part of U.S. Non-provisional patent application Ser. No. 10/781,201 filed Feb. 17, 2004, now abandoned, which claims the benefit of U.S. Provisional Patent Application Ser. No. 60/491,880 filed Aug. 1, 2003, the disclosures of all of which are hereby incorporated by reference herein, in their entirety, for all purposes.

FIELD OF THE INVENTION

The present invention relates to animal chews and particularly to animal chew toys having an animal hide enclosing a filling.

BACKGROUND

Commercial pet chew toys, particularly those for dogs, are designed typically to exercise the jaw muscles of a pet and through prolonged mastication, work to clean the teeth and gums. Chew toys for dogs include those that incorporate a meat and rawhide formulation as part of their manufacturing process. For example, some chew toys are filled rawhide products with meat content. Other edible pet toys or treats are manufactured via a process where a flat, jerked piece of meat is inserted along the seam of the rawhide chew with the jerked meat making the rawhide chew more appealing for dogs to chew and thereby exercise and clean their teeth and gums.

A dried hide may be rehydrated for purposes of shaping via a water submersion process. If the shaping of rehydrated hide requires twisting about an inner filling core, a typical twisting process used to make standard hide twists is often unacceptable due to the twisting pressure driving portions of the inner core filling to extend beyond, or to appear braided on, the outside of the hide rather than being positioned in the direction in the center of the product.

SUMMARY

Exemplary edible chew toy treat embodiments of the present invention include constituent elements such as an outer casing, preferably made of pork hide, bovine rawhide and other animal hides or simulated hides that are particularly appealing to dogs. The chew may be manufactured in a variety of shapes, such as rolls, twists, bones, sticks, pressed bones, pressed rolls, pressed twists, ear shapes, chicken wing shapes, and any other shapes that can be made from the pork hide and bovine rawhide and other animal hide and simulated hide materials.

In the several embodiments of the present invention, the center of the chew contains one of several inner fills that are manufactured through an extrusion process. The preferred filings include a dry animal protein filling preferably having less than 25% animal protein, and/or a wheat gluten, mint and parsley filling, and a wheat gluten and dry vegetable filling.

The fillings of embodiments of the present invention are located substantially within the middle of the chew. Fillings of the present invention may include, in alternative embodiments, one or more nutritional supplements, e.g., multi-vitamin, minerals, omega-3, and glucosamine.

Another exemplary method of pet chew manufacture comprises, not necessarily in the following order: (a) rehyrating dried hide, e.g., rawhide or pork hide; (b) providing a sheath having a proximal end and a distal end; (c) inserting one or more inner fill cords into the sheath, wherein the inserted one or more inner fill cords extend beyond the distal end of the shealth; (d) wrapping one or more strips of rehydrated hide about the sheath, wherein the wrapped one or more strips of rehydrated hide extend beyond the distal end of the shealth; (e) securing a portion of the one or more inner fill cords extending beyond the distal end of the shealth with a portion of the wrapped one or more strips of rehydrated hide extending beyond the distal end of the shealth as an assembly; and (e) withdrawing, at the proximal end of the sheath, the sheath from the assembly of one or more inner fill cords and one more strips of rehydrated hide. In addition, the method of manufacture may include steam rehydration.

BRIEF DESCRIPTION OF THE DRAWINGS

For a further understanding of the nature and objects of the present invention, reference should be made to the following detailed description, taken in conjunction with the accompanying drawings, in which like elements are given the same or analogous reference numbers and wherein:

FIGS. 9A, 9B, 9C and 9D illustrate an exemplary manufacturing embodiment of the present invention.

DETAILED DESCRIPTION

Figure 1:
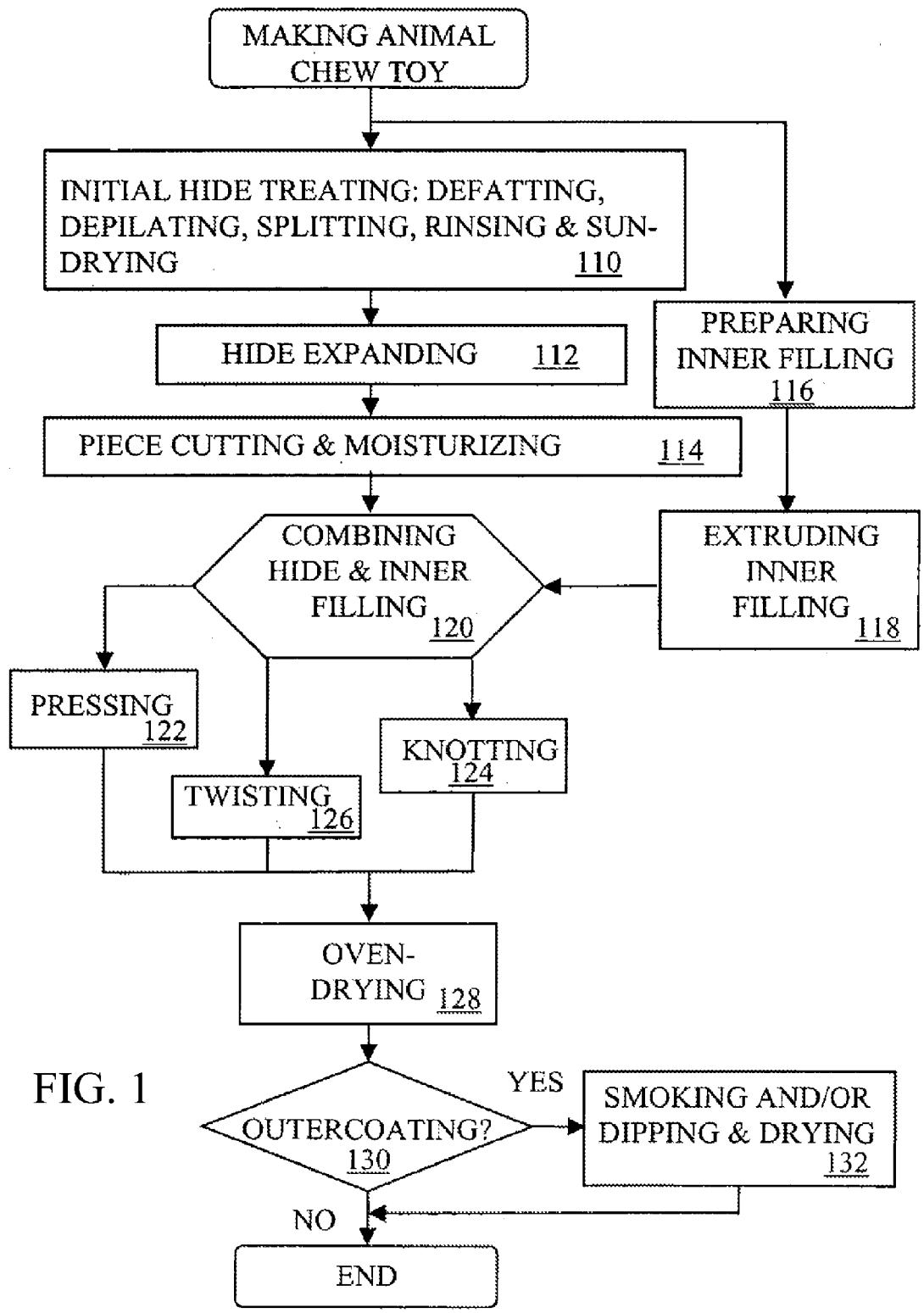
FIG. 1 is a flowchart of the overall process of the present invention.

The invention, in its several embodiments, is described below together with figures herein referenced and incorporated by reference in this disclosure. An overview of the process of making the animal chew toy is illustrated in FIG. 1. The process 100 involves two concurrent or roughly parallel subprocess paths: the hide or casing preparation 102 and the inner filling preparation 104. In the inner filling preparation 116, alternative embodiments of the present invention include a rod of extruded, dried products, e.g., meat, vegetables, or wheat-mint-parsley, that have been shown to be very appealing to dogs where the rod is highly flavored, and appetizing to the pet, that, as a fill product or filling, is placed in the center of the chew during manufacturing. The extrusion process is comprised of a mass containing the constituent ingredients that is ground to an extremely smooth consistency, a consistency comparable for example to that of bread dough or paste. The filling as a paste is then forced through a die under pressure, creating one of several shapes including for example flat strips, round sticks and other shapes appropriate for the inner filling of the chew toy embodiments of the present invention. In its several embodiments, this rod is a strip, a plug or a piece. Depending on the desired chew toy product, the filling piece may be shaped in various ways to accommodate the type of product being manufactured.

In the hide preparation subprocess 102, the initial hide treatment includes a defatting and depilation treatment 110. Included in this step is the splitting of the hide to obtain successive layers of rawhide materials and the rinsing and sun-drying of the layers of hide. An additional step in the finishing process may in some embodiments be applied to make the hide appear thicker 112. This alternative step 112 involves expanding the hide, using a combined solution of fresh water and hydrogen peroxide for a period of time. Preferably, the hydrogen peroxide to water is 20 percent by volume and the exposure of the hide layer to the solution is approximately four hours.

Depending upon the type of chew being manufactured, the finished hide is cut into various sizes of pieces, strips, or shreds and moisture is added in order to make the product pliable for further processing (step 114). Once an inner filling is prepared (step 116), it is extruded 118 and combined 120. Depending of the shape of the chew, that is, depending on the mode of shaping, there is alternatively a step of pressing 122, twisting 126 or knotting 124. Thereafter, oven-drying 128 is used to finish the product. In some alternative embodiments, if overcoating is desired 130, a smoking and/or dipping and drying step 132 is included to finish the product.

For example, in manufacturing the chew having a twist shape, long strips of porkhide or bovine rawhide and other animal hides or simulated hides that are particularly appealing to dogs are twisted together preferably with a rod of hot or cold extruded meat, vegetable, or wheat gluten-mint-parsley in the middle, to a length of approximately 6 feet and secured on a rack. These racks are then placed in a low temperature oven at approximately 40 degrees centigrade for approximately 3-4 days to dry very slowly from the inside out. When fully dry, about 5-7% moisture by weight, the 6-foot length is removed and cut into shorter lengths of from 4 inches up to 10 inches, for example.

In another manufacturing process example, the dried hide is rehydrated via a steam process, rather than a water submersion process. Water submersion of the dried hide has the potential side of effect of mold development in overly hydrated hides. The steam process minimizes the potential for over hydration of the hide. Additionally, unlike a water submersion process, re-hydration via steam acts to kill most microbes, effectively sterilizing the hide and the steam also works to flush out chemical residue from the hide. The technique of rehydrating provides for a hide that is cleaner and healthier for pet consumption when compared to a water submersion process.

Continuing with this exemplary manufacturing process, after extruding, the inner filling is comprised of approximately 40-50% water. In order to prevent the inner filling from becoming moldy, the high water content may be lowered to below 10% prior to combining the inner filling with the rehydrated hide. Accordingly, prior to combining with the rehydrated hide, the extruded inner filling is placed on stainless steel racks, sent to an industrial drying oven and dried for 24-36 hours, at a temperature of 65 degrees Celsius, until the inner filling reaches a moisture content of 7-9%. The inner filling, as inner fill cords may then be used as elements in the assembly of a pet chew or edible pet treat.

Figure 2A:
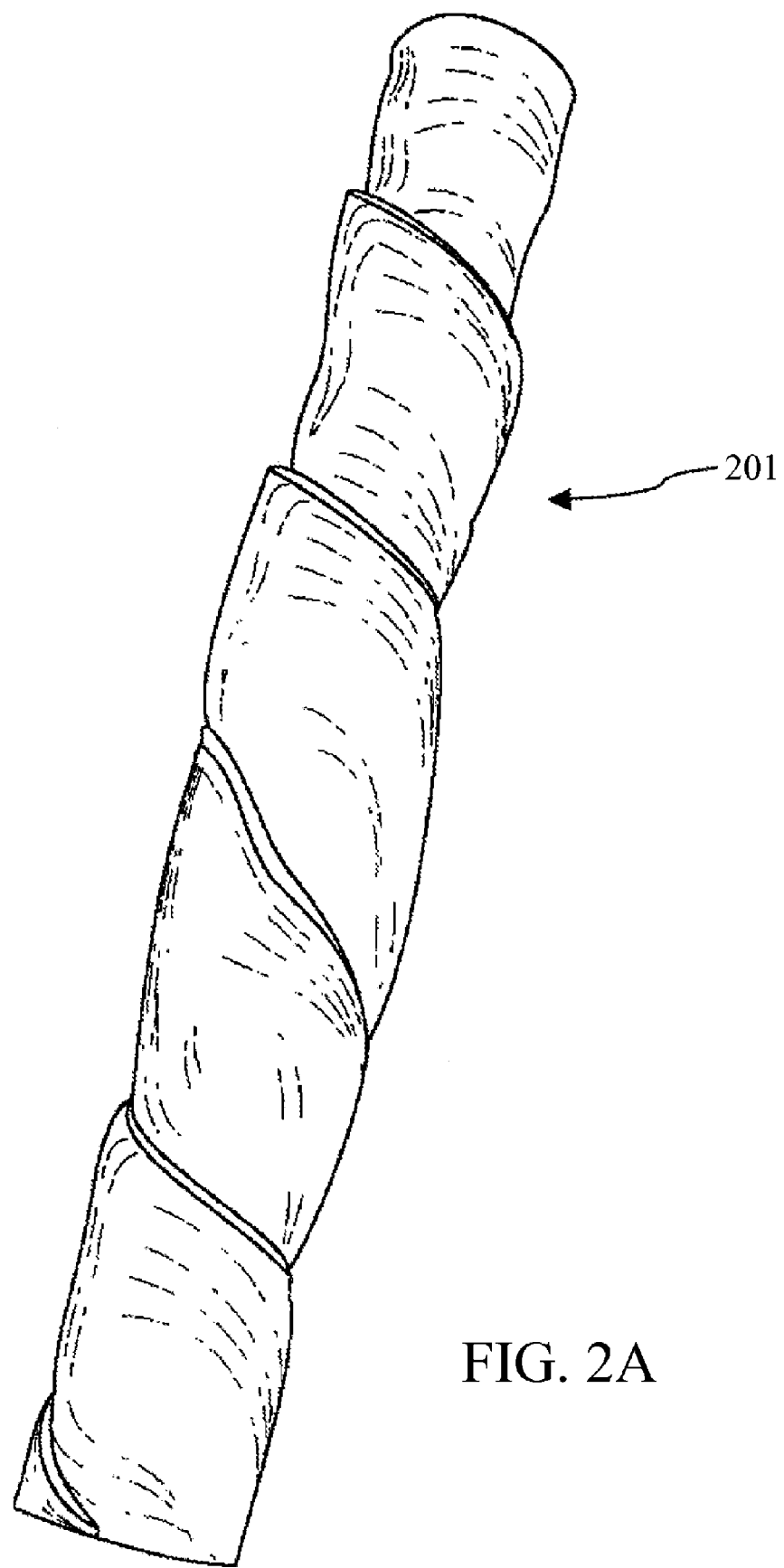
FIG. 2A is a top view of a filled expanded rawhide twist, having a filling, in accordance with a preferred embodiment of the present invention.
Figure 2B:
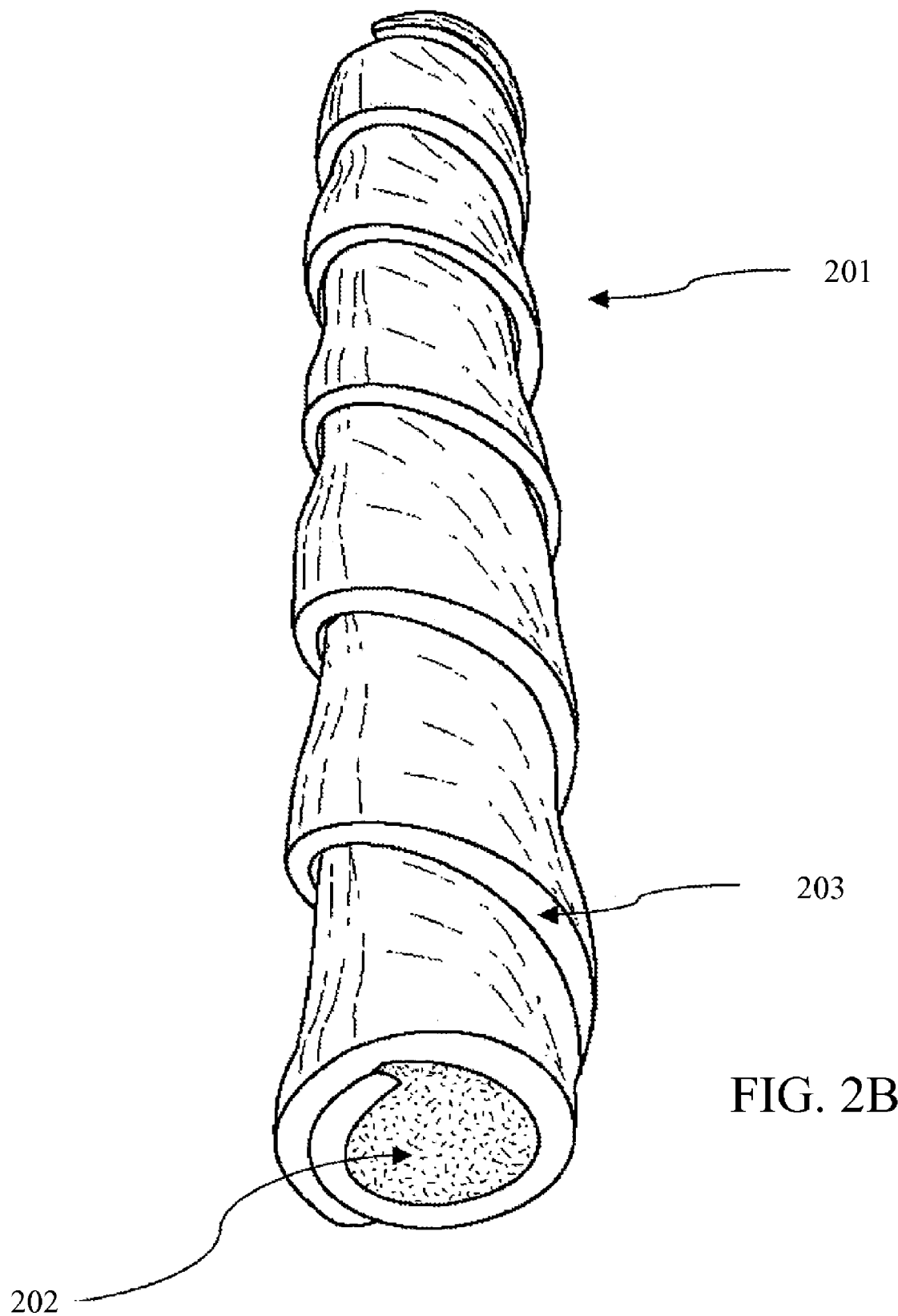
FIG. 2B is a perspective view of an expanded rawhide twist, having a filling, in accordance with a preferred embodiment of the present invention.
Figure 3:
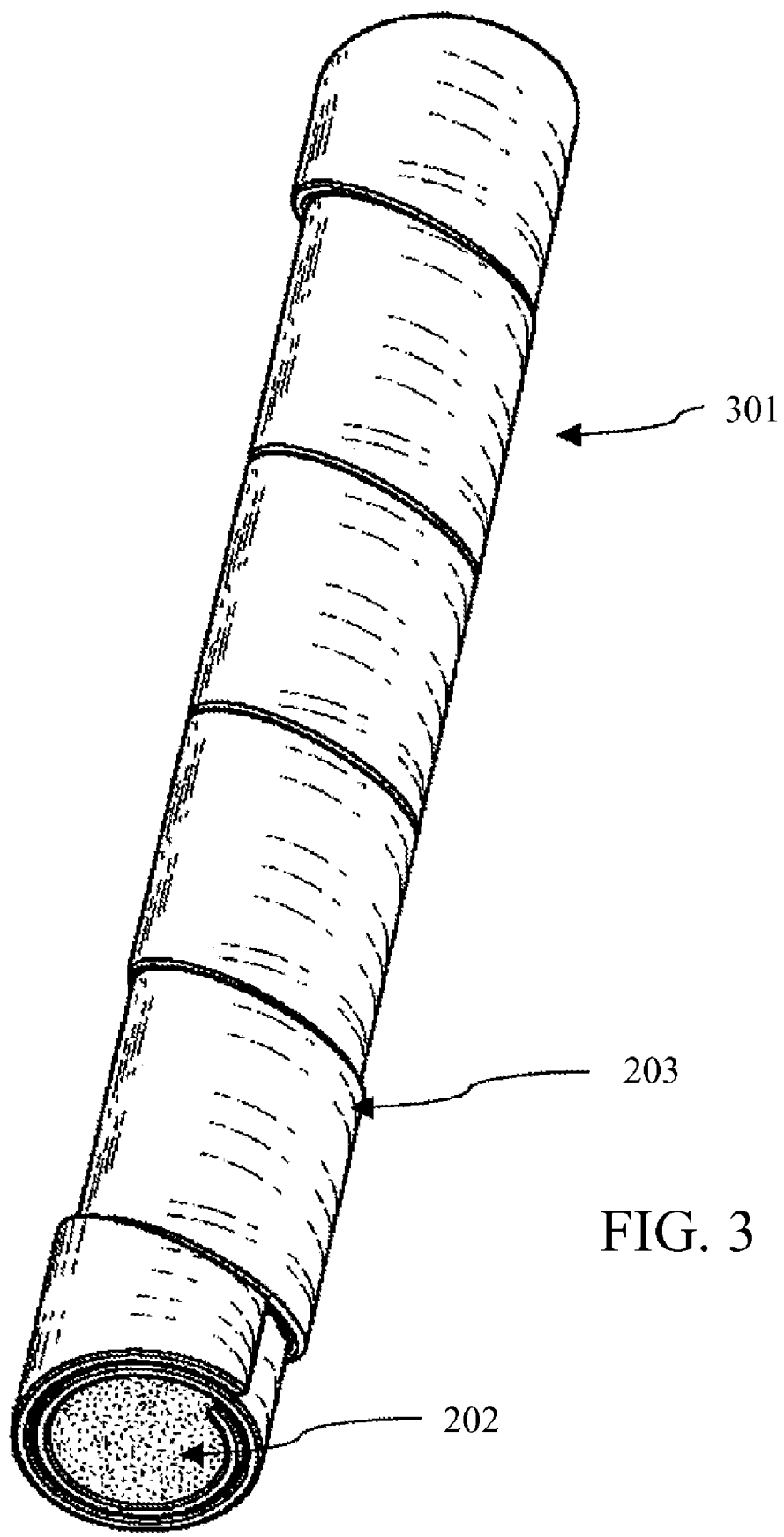
FIG. 3 is a perspective view of a filled natural rawhide twist, having a filling, in accordance with a preferred embodiment of the present invention.

FIG. 2A illustrates a top view of an expanded rawhide twist 201 and FIG. 2B illustrates a perspective view of the expanded rawhide twist 201 illustrating it having a filling 202. The twist is made preferably of a pork or bovine rawhide and other animal hides or simulated hides that are particularly appealing to dogs 203, which is formed into a twist shape. The expanded rawhide twist 201 makes the hide 203 appear thicker. The expanded rawhide twist 201 encases a filling 202 which can be hot or cold extruded meat, vegetable or wheat-gluten-mint-parsley, for example. Such twists may, as an alternative, not employ the expansion step and accordingly appear more compact as in FIG. 3 that illustrates a perspective view of a natural rawhide twist 301 having a filling 202. Like the expanded rawhide, the natural rawhide twist may be made preferably of a pork or bovine rawhide and other animal hides or simulated hides that are particularly appealing to dogs 203, which is formed into a twist shape. As with the expanded hide, the natural rawhide twist encases a filling 202 which can be hot or cold extruded meat, vegetable or wheat-gluten-mint-parsley.

Figure 4:
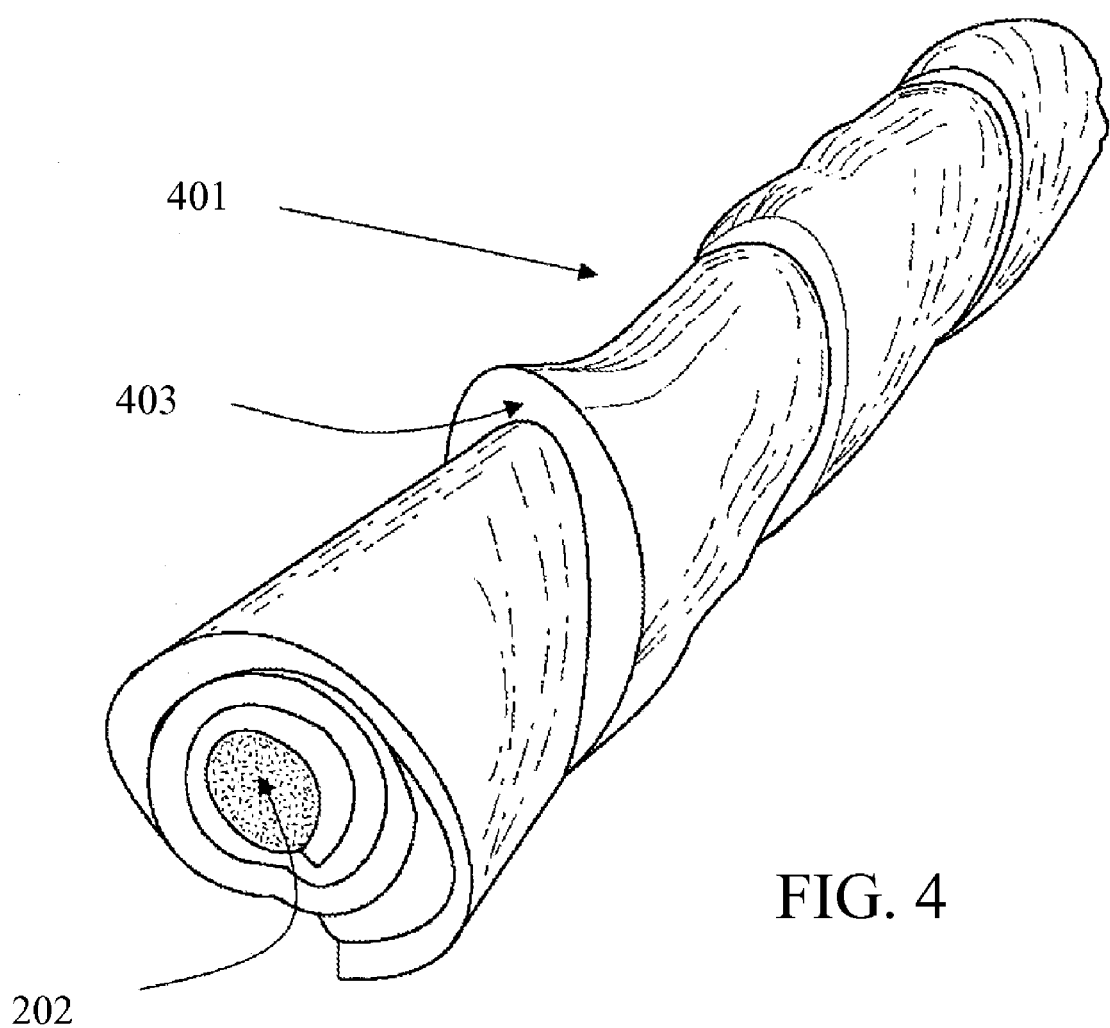
FIG. 4 is a perspective view of a mesquite-smoked, rawhide twist, having a filling, in accordance with a preferred embodiment of the present invention.

FIG. 4 illustrates a perspective view of a mesquite-smoked, pork hide twist 401 having a filling 202. The twist is made preferably of a mesquite-smoked, pork hide 403, which is formed into a twist shape having more turns and a rolling angle steeper than those previously illustrated. As is the case with the expanded and natural hides, the twist encases a filling 202 which can be hot or cold extruded meat, vegetable or wheat-gluten-mint-parsley.

Figure 5:
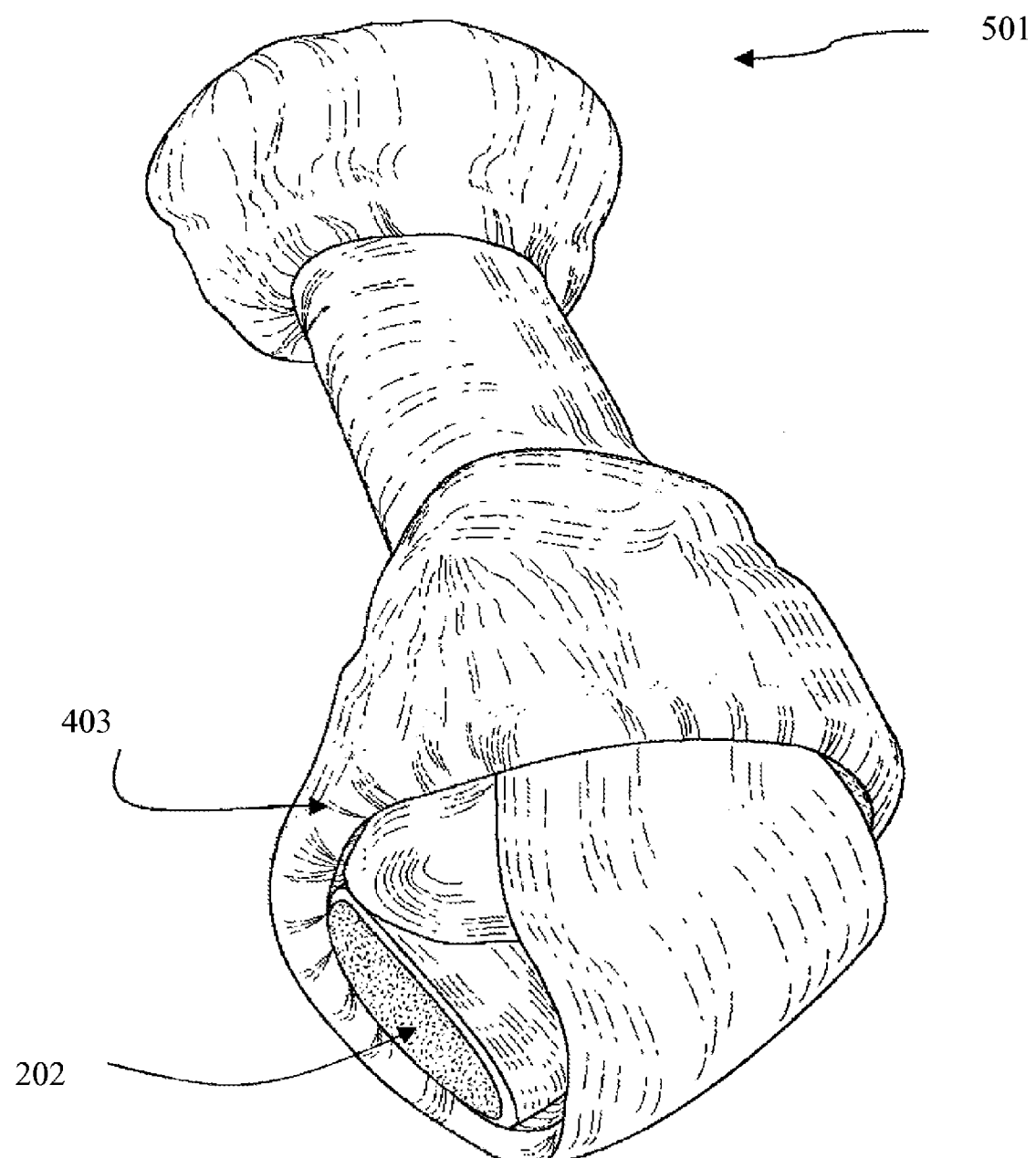
FIG. 5 is a perspective view of a mesquite-smoked, knotted rawhide bone-shaped twist, having a filling, in accordance with a preferred embodiment of the present invention.

FIG. 5 illustrates a perspective view of a mesquite-smoked, knotted pork hide bone-shaped twist 501 having a filling 202. Preferably, the knot is produced through a hand-tying process or a mechanized equivalent. During this process, a filling 202 is extruded into a long, flat strip or rod. The flat strip is cut to length and placed from end to end, in the middle of the rectangular piece of pork hide or bovine rawhide and other animal hides or simulated hides that are particularly appealing to dogs 203. After placement of the fill strip 202, the hide 203 is folded, length wise and knotted at both ends.

Figure 6A:
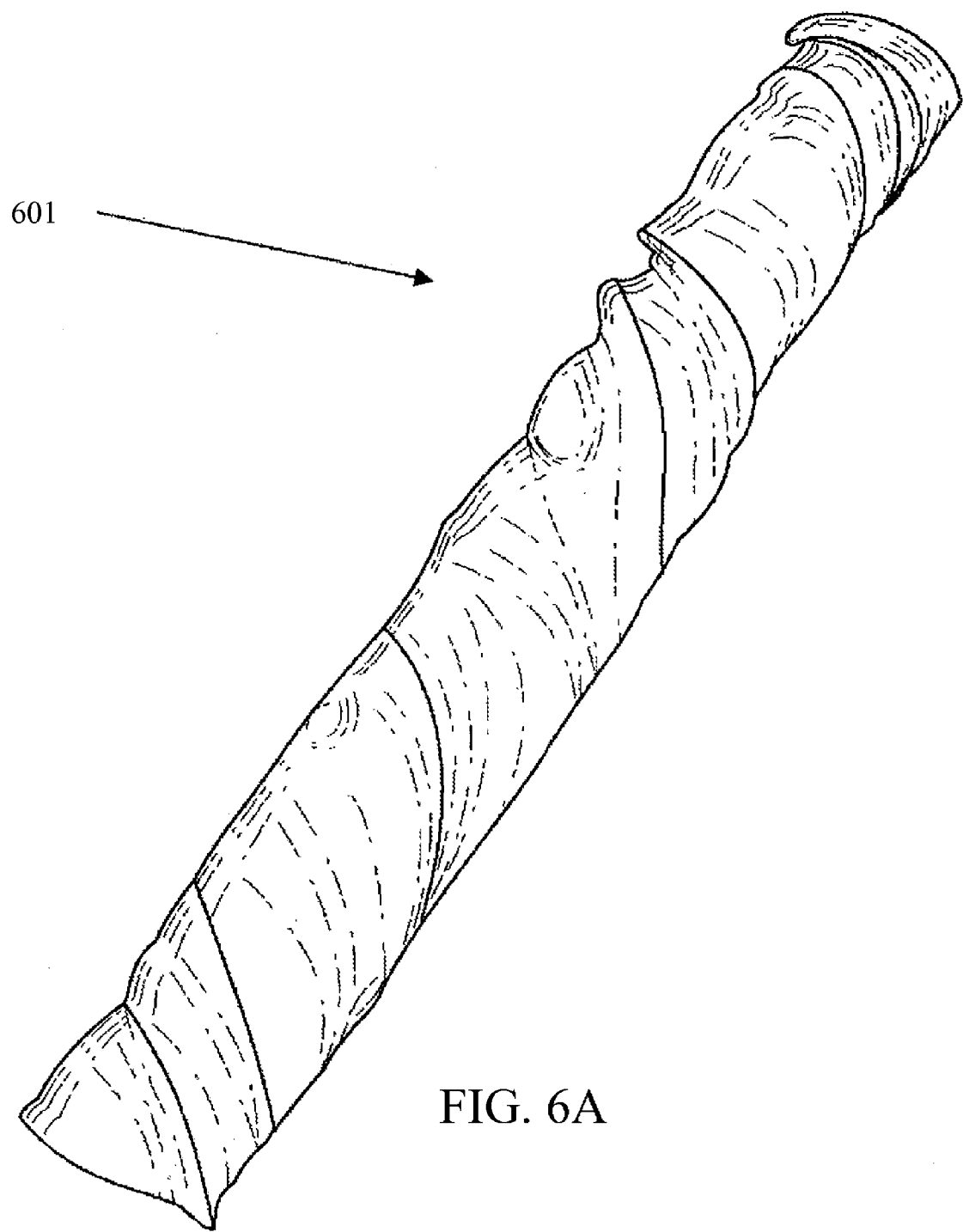
FIG. 6A is a top view of a savory-bacon coated, rawhide twist, having a filling, in accordance with a preferred embodiment of the present invention.
Figure 6B:
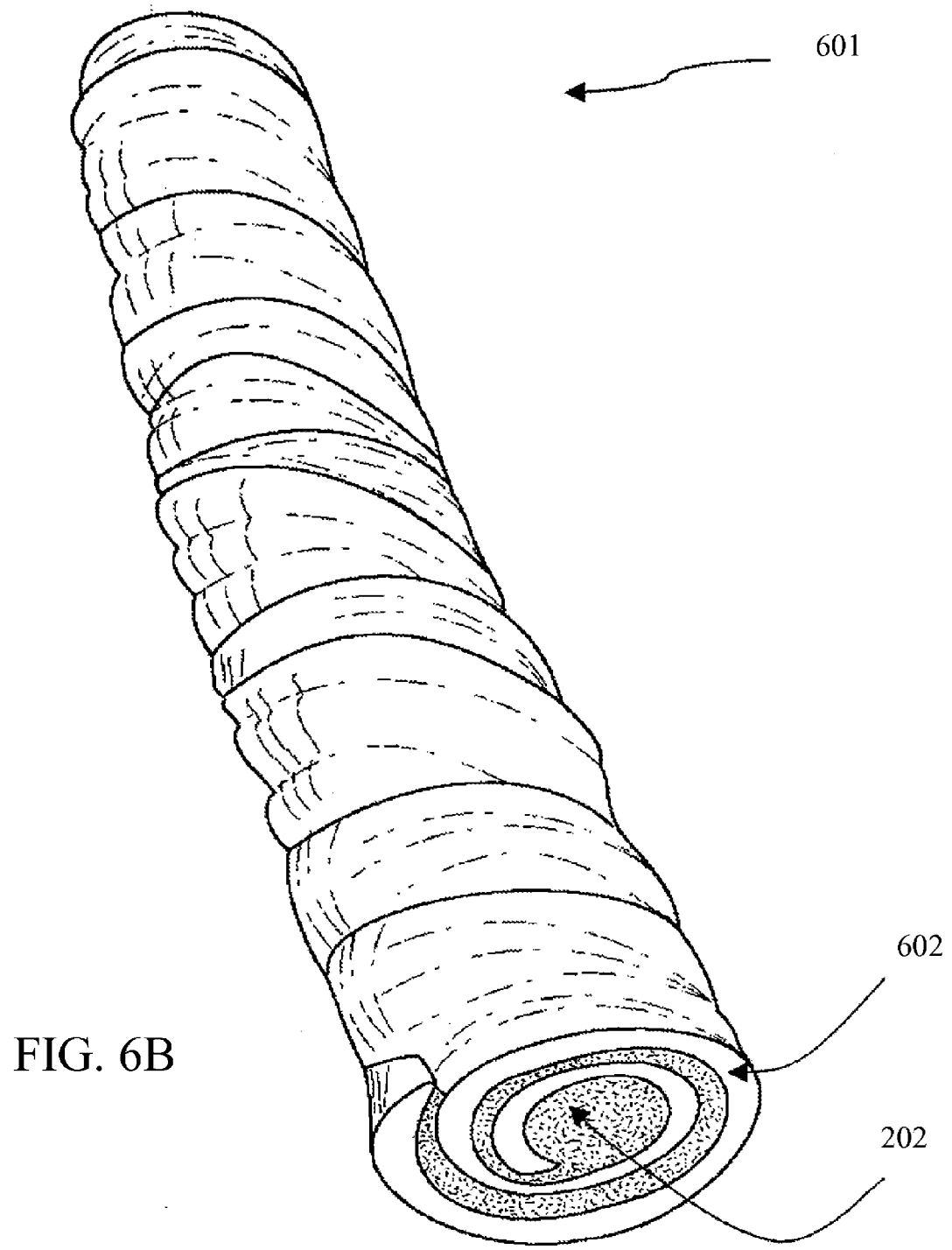
FIG. 6B is a perspective view of a savory-bacon coated, rawhide twist, having a filling, in accordance with a preferred embodiment of the present invention.

FIG. 6A illustrates a top view of a savory-bacon coated, pork hide twist 601. The shape of the expanded twist is maintained. FIG. 6B illustrates a perspective view of a savory-bacon coated, pork hide twist 601 having a filling 202. The twist is made preferably of a savory-bacon coated, pork hide 602, which is formed into a twist shape. As with the twists without coatings, this twist encases a filling 202 which can be hot or cold extruded meat, vegetable or wheat-gluten-mint-parsley.

Figure 7A:
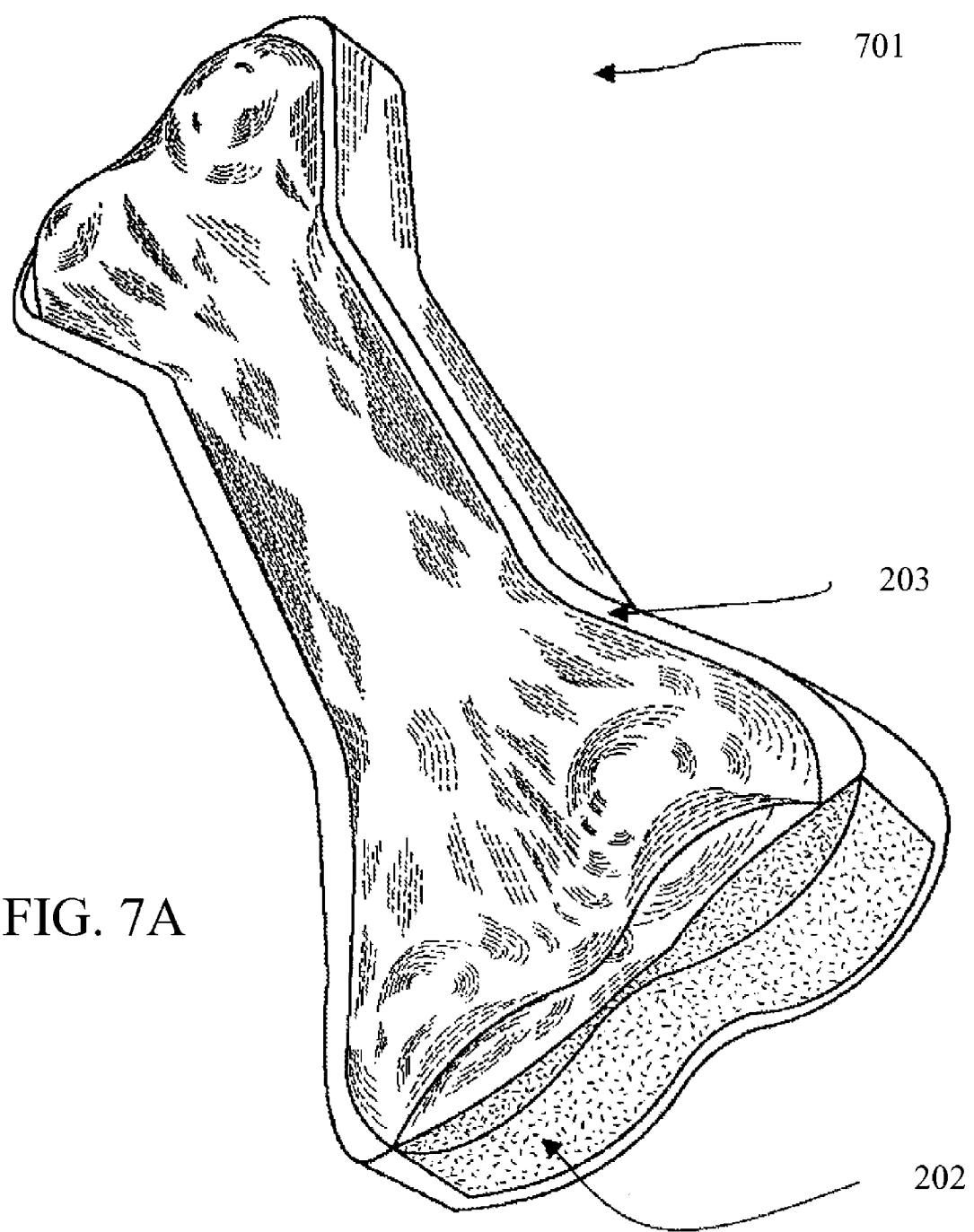
FIG. 7A is a perspective view of a rawhide pressed bone, having a filling, in accordance with a preferred embodiment of the present invention.
Figure 7B:
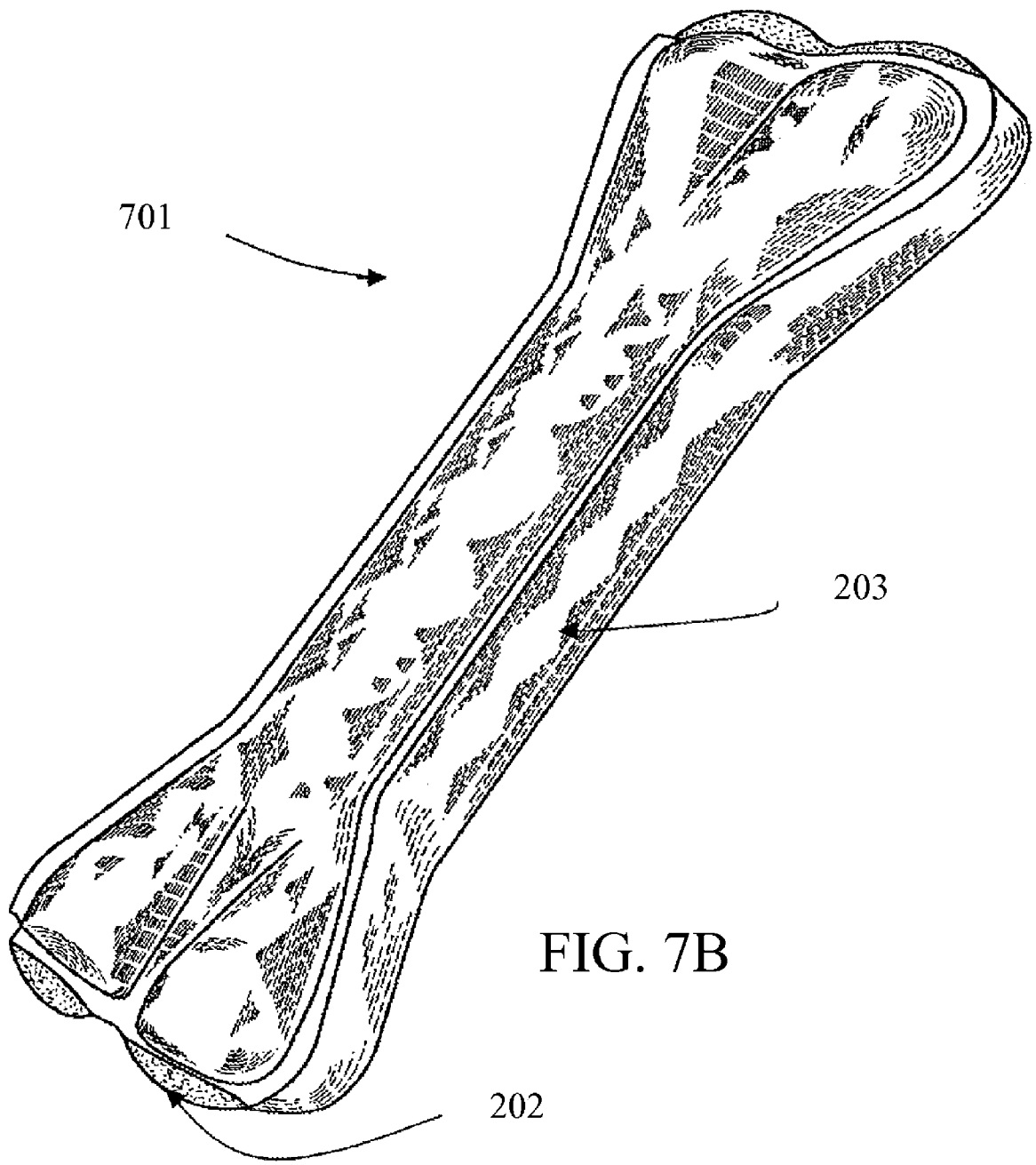
FIG. 7B is an alternate perspective view of a rawhide pressed bone, having a filling, in accordance with a preferred embodiment of the present invention.

FIG. 7A illustrates a perspective view of a rawhide pressed bone 701 having a filling or plug 202. The bone is made preferably of pork or bovine rawhide and other animal hides or simulated hides that are particularly appealing to dogs 203, which is formed into a bone shape. The rawhide pressed bone 701 encases a filling or plug 202 which can be hot or cold extruded meat, vegetable or wheat-gluten-mint-parsley. FIG. 7B illustrates in an alternate perspective view of a rawhide pressed bone 701 having a filling or plug 202. In the manufacture of the pressed bone, the inner plug 202 of hot or cold extruded meat, vegetable, or wheat gluten-mint-parsley is wrapped around the outside by a piece of pork hide or bovine rawhide and other animal hides or simulated hides that are particularly appealing to dogs 203, where the ends of the plug remaining exposed. The wrapped plug is placed in a high-pressure, preferably metal, die press and pressed into the desired shape. This embodied product is also dried in an oven to the necessary moisture level. This process can be used to make pressed shapes other than bones including pressed twists, pressed sticks, pressed rib bones, pressed chicken wings, and various other shapes.

Figure 8A:
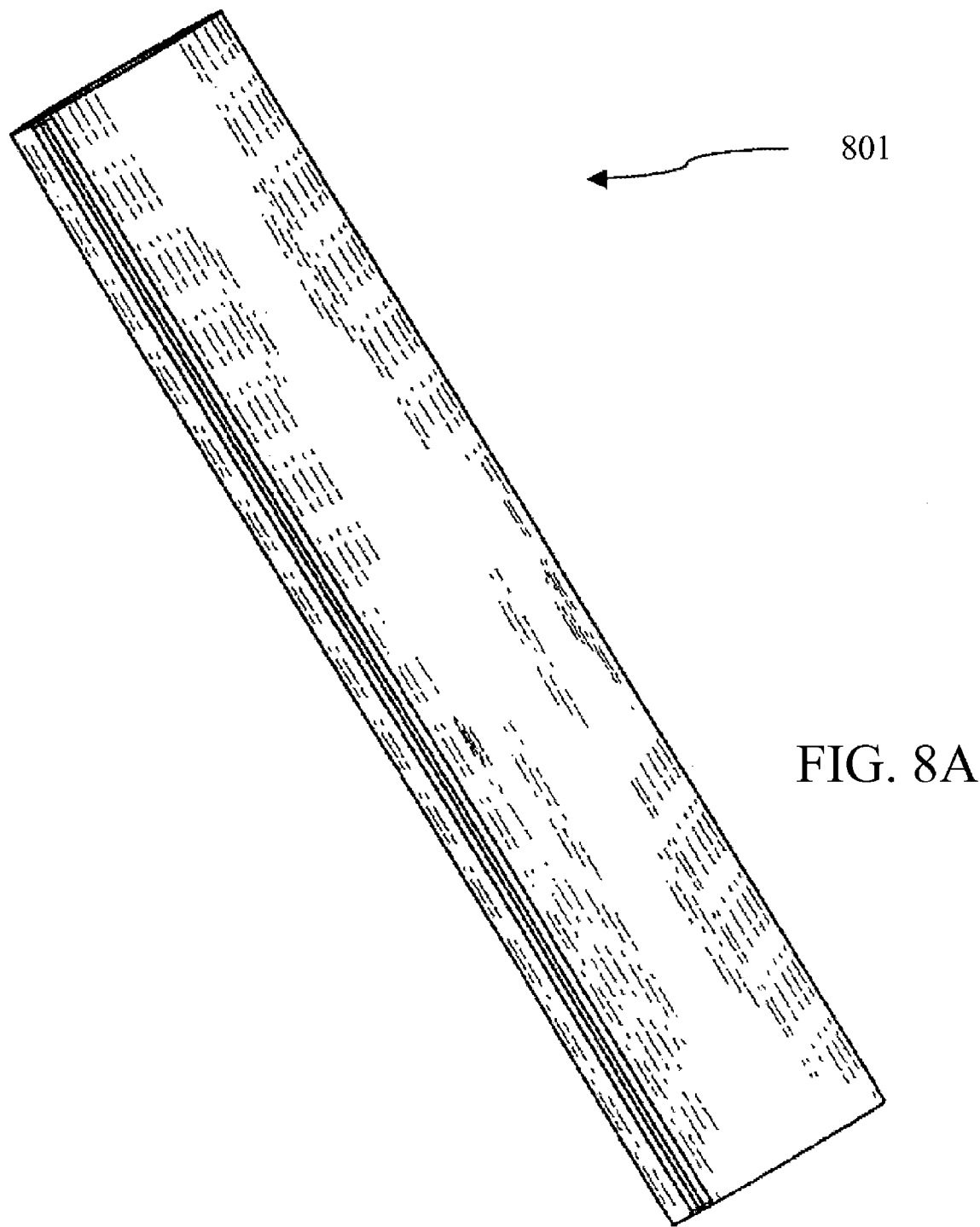
FIG. 8A is a top view of rawhide pressed stick, having a filling, in accordance with a preferred embodiment of the present invention.
Figure 8B:
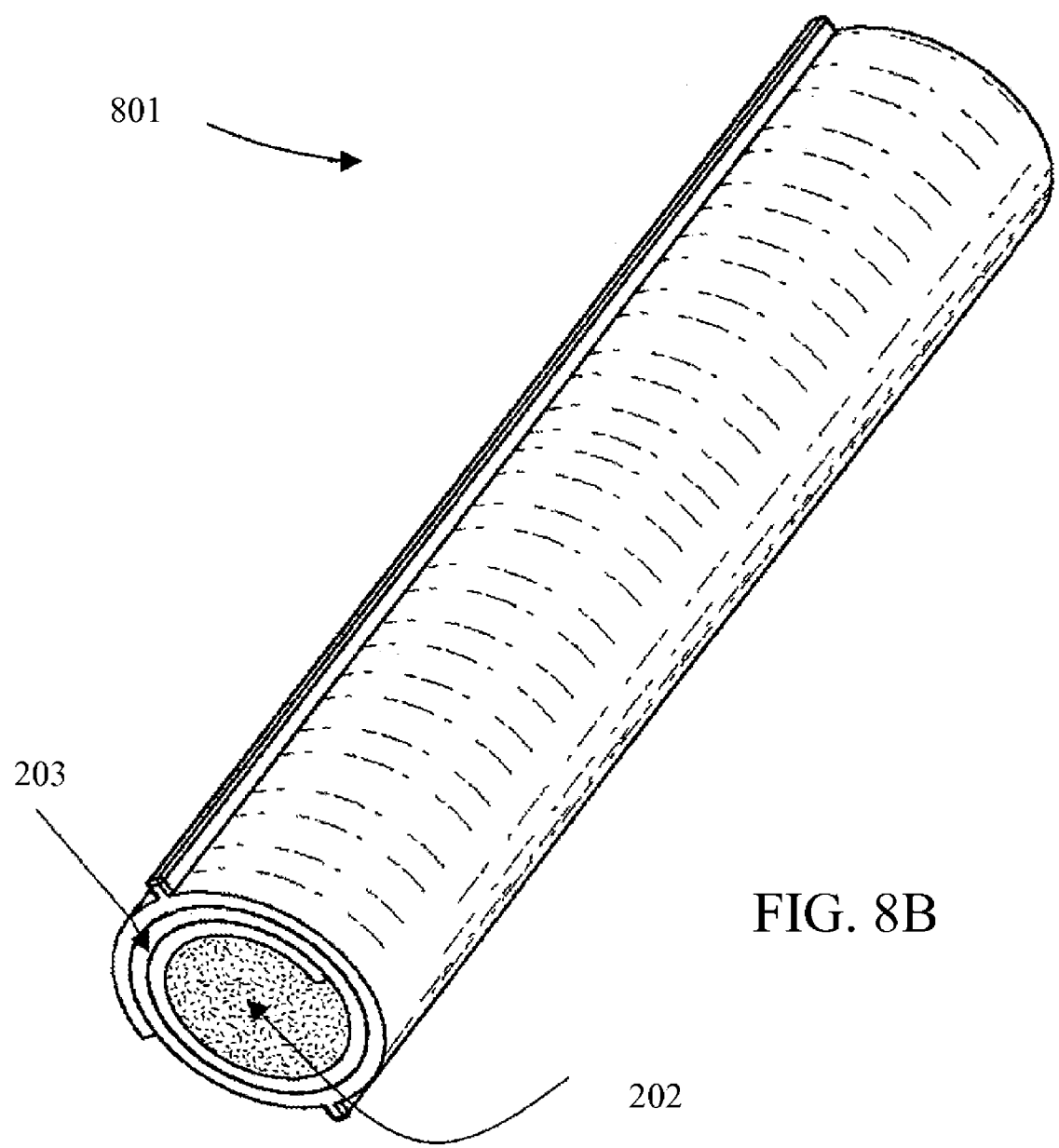
FIG. 8B is a perspective view of rawhide pressed stick, having a filling, in accordance with a preferred embodiment of the present invention.
Figure 9:
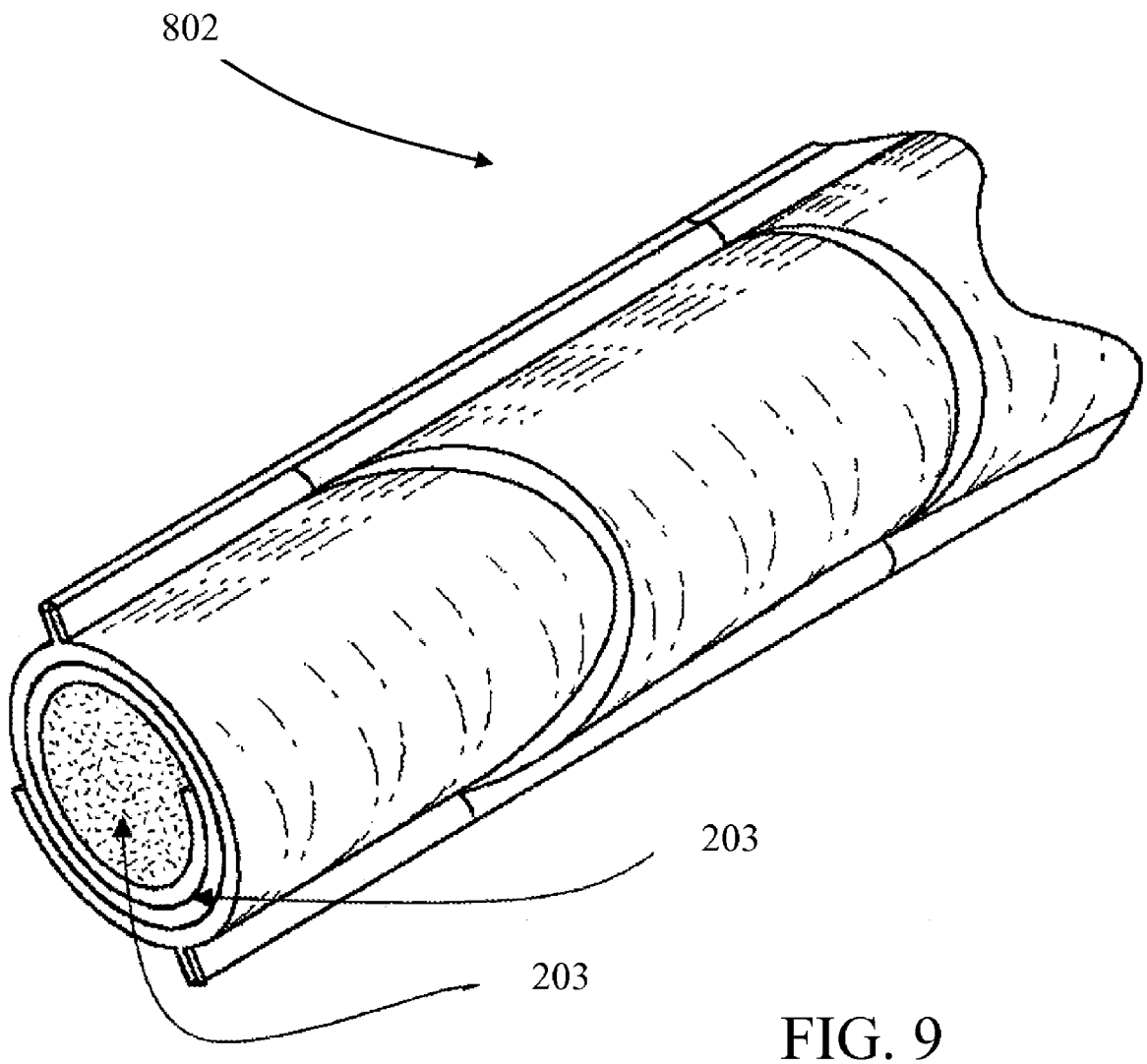
FIG. 9 is a layered cutaway view of the rawhide pressed stick, having a filling, in accordance with a preferred embodiment of the present invention.
Figure 9:
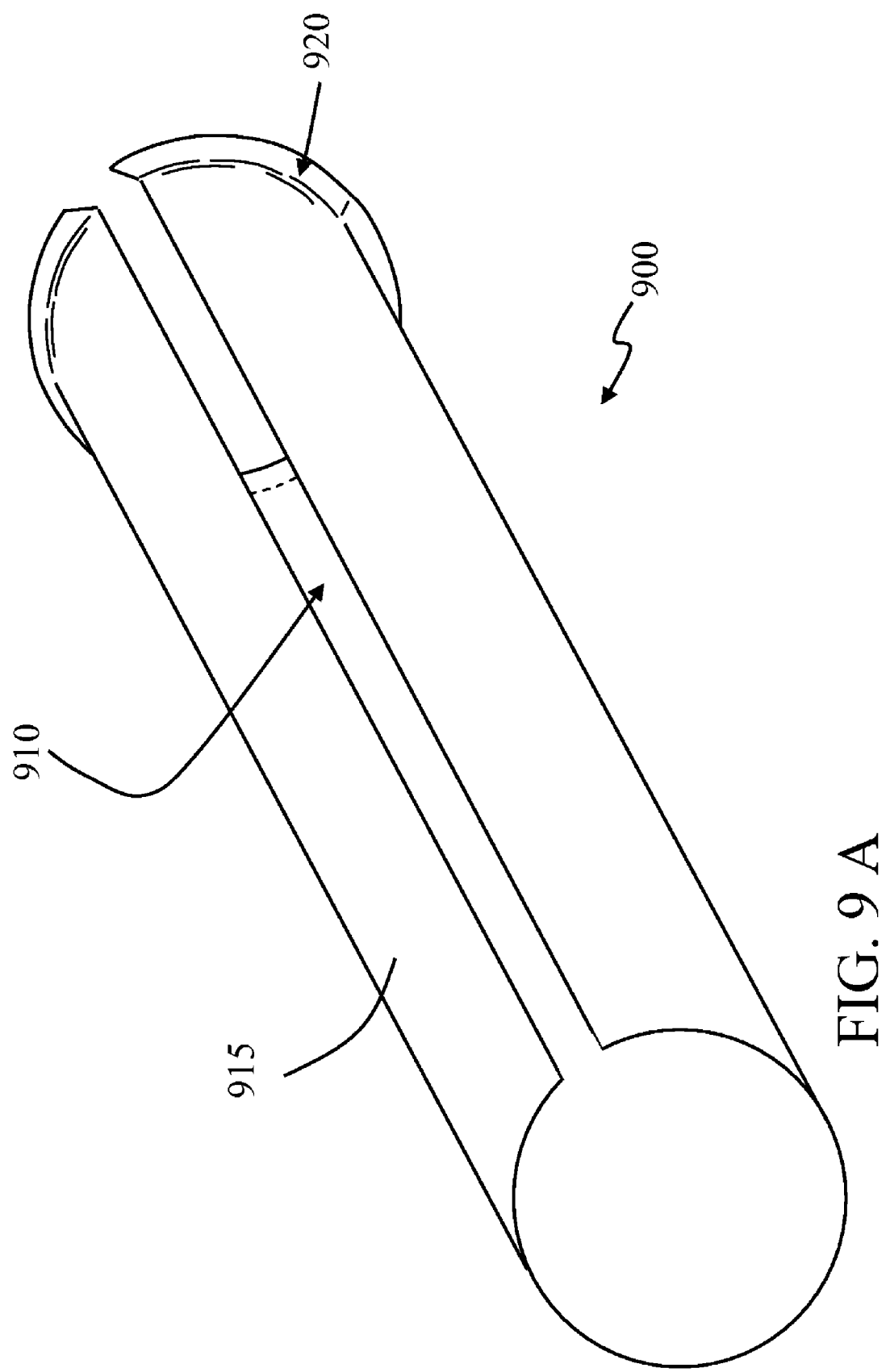

FIG. 8A illustrates a top view of a rawhide pressed stick 801 and FIG. 8B illustrates a perspective view of a rawhide pressed stick 801 having a filling 202. The stick is made preferably of pork or bovine rawhide and other animal hides or simulated hides that are particularly appealing to dogs 203, which is formed into a stick shape. As with other embodiments, the rawhide pressed stick 801 encases a filling 202 which can be hot or cold extruded meat, vegetable or wheat-gluten-mint-parsley. FIG. 9 illustrates a layered cutaway view of a rawhide pressed stick 801 having a filling 202.

Inner Filling

The inner fill 202 of the chew embodiments described are preferably filled with one of the following: a dry meat product, containing less than 25% meat; a wheat gluten, mint and parsley product; or a wheat gluten, dry vegetable product.

EXAMPLE 1

Ingredients and preparation of the dry meat product containing less than 25% meat are illustrated by example as follows in Table I.

TABLE I

| Ingredients | Percentage by weight |
| --- | --- |
| Beef | 28-30% |
| Wheat Flour | 15-17% |
| Soy Flour | 14-15% |
| Wheat Middlings | 10-12% |
| Corn Syrup | 5-7% |
| Wheat Gluten | 5-7% |
| Corn Starch | 4-6% |
| Sugar | 3-5% |
| Propylene Glycol | 3-5% |
| Salt | Less than 1% |
| Caramel Color | Less than 1% |
| Phosphoric Acid | Less than 1% |
| Animal Fat | Less than 1% |
| Potassium Sorbate | Less than 1% |
| Garlic Powder | Less than 1% |
| Onion Extract | Less than 1% |
| Bone Phosphate | Less than 1% |
| Natural Smoke Flavor | Less than 1% |
| BHA(Used as a preservative) | Less than 1% |

In preparation, the beef is thawed and ground into one-quarter inch pieces. After grinding, the meat is preferably placed in a horizontal bowl cutter and cut into a smooth paste. Upon completion, the beef and all other ingredients are placed in a horizontal mixer and blended until smooth. The mixture is then preferably placed into a hot extrusion machine where the formula is again blended and heated to a temperature of 105 degrees centigrade. The mixture passes through a stainless steel tube containing a corkscrew-shaped stainless steel shaft located inside the stainless steel tube. The stainless steel tube and stainless steel shaft create a sustained pressure behind the mixture, which is forced through a template that produces a flat strip or round stick.

The extrusion then passes through an oven and is dried at 85 degrees centigrade for approximately 2 hours until the moisture content of the extrusion is reduced to 24%. The product is then cooled, vacuum packaged, and stored at room temperature.

EXAMPLE 2

Ingredients and preparation of the wheat gluten, mint and parsley product are illustrated by example as follows in Table II.

TABLE II

| Ingredients | Percentage by weight |
| --- | --- |
| Gluten | 28-30% |
| Glycerine | 12-14% |
| Rice Flour | 12-14% |
| Sweet Rice Flour | 11-13% |
| Deionized Water | 11-13% |
| Chicken Meal | 8-11% |
| Gelatin | 6-8% |
| Lecithin | Less than 1% |
| Sodium Diacetate | Less than 1% |
| Fennel Seed Powder | Less than 1% |
| Dill Seed Powder | Less than 1% |
| Sodium Tripolyphosphate | Less than 1% |
| Chlorophyll | Less than 1% |
| Peppermint Oil | Less than 1% |
| Parsley Herb Oil | Less than 1% |

In preparation, all of the above ingredients are placed in a horizontal mixer and blended until smooth. The mixture is then placed into the hot extrusion machine where the formula is again blended and heated to a temperature of approximately 105 degrees centigrade. The mixture passes through a stainless steel tube containing a corkscrew-shaped stainless steel shaft located inside the stainless steel tube. The stainless steel tube and stainless steel shaft create a sustained pressure behind the mixture, which is forced through a template that produces a flat strip or round stick. The extrusion then passes through an oven and is dried at approximately 85 degrees Centigrade for approximately two hours, until the moisture content of the extrusion is reduced to approximately 24%. The product is then cooled, vacuum packaged, and stored at room temperature.

EXAMPLE 3

Ingredients and preparation of the wheat gluten and dry vegetable product are illustrated by example as follows in Table III.

TABLE III

| Ingredients | Percentage by weight |
| --- | --- |
| Wheat Gluten | 44-46% |
| Glycerine | 22-24% |
| Powdered Dehydrated Vegetables (including carrots, potatoes, celery, beets, parsley, watercress, and spinach) | 19-21% |
| Deionized Water | 4-6% |
| Gelatin | 3-5% |
| Lecithin | Less than 1% |
| Sodium Diacetate | Less than 1% |
| Fennel Seed Powder | Less than 1% |
| Dill Seed Powder | Less than 1% |
| Sodium Tripolyphosphate | Less than 1% |

In preparation, all of the above ingredients are placed in a horizontal mixer and blended for approximately 10 minutes, until smooth. The mixture is then placed into the hot extrusion machine where the formula is again blended and heated to a temperature of approximately 105 degrees centigrade. The mixture passes through a stainless steel tube containing a corkscrew-shaped stainless steel shaft located inside the stainless steel tube. The stainless steel tube and stainless steel shaft create a sustained pressure behind the mixture, which is forced through a template that produces a flat strip or round stick. The extrusion then passes through an oven and is dried at approximately 85 degrees centigrade for approximately 2 hours, until the moisture content of the extrusion is reduced to approximately 24%. The product is then cooled, vacuum packaged, and stored at room temperature.

Further processing optionally includes utilizing a natural mesquite smoking process, as well as flavor coating the entire product. Additionally, any of the above chews can be dipped in liquid gluten derived from pork hide or bovine rawhide 203. The liquid gluten enhances the durability of the chew by providing an additional, hard outer layer.

Some of the embodiments of the present invention include a savory smoked bacon flavor (FIG. 6B) coating made of the following ingredients in Table IV.

TABLE IV

| Ingredients | Percentage by weight |
| --- | --- |
| Beef | 49-51% |
| Natural Molasses | 17-19% |
| Liquid Smoke | 11-3% |
| Soy Protein | 7-9% |
| Wheat Gluten | 5-6% |
| Propylene Glycol | 5-6% |
| Beef Marrow | Less than 1% |
| Brewers Yeast | Less than 1% |

In preparation, fresh beef or thawed frozen beef is ground into one-quarter inch pieces. The meat is blended in a horizontal mixer with the natural molasses, liquid smoke, soy protein, wheat gluten, propylene glycol, beef marrow and brewers yeast. After mixing the formulation is then passed through an emulsifier for a finer degree of grinding. This fine ground emulsion is placed in a reactor vessel, where it is stirred and heated to approximately 70 degrees centigrade for approximately one hour. After cooling the mixture is again emulsified to a finer degree and returned to the reactor vessel, where it is stirred and heated to approximately 85 degrees centigrade for approximately one hour. The pH of the mixture is adjusted to approximately 3.0. Finally the product is cooled, packaged in sterile drums, and stored at room temperature.

A dried hide may be rehydrated for purposes of shaping via a water submersion process or a steam hydration process. If the shaping of rehydrated hide requires twisting about an inner filling core, a typical twisting processes used to make standard hide twists may be unacceptable in production due to the twisting pressure driving portions of the inner core filling to extend beyond, or to appear braided on, the outside of the hide.

Figure 9B:
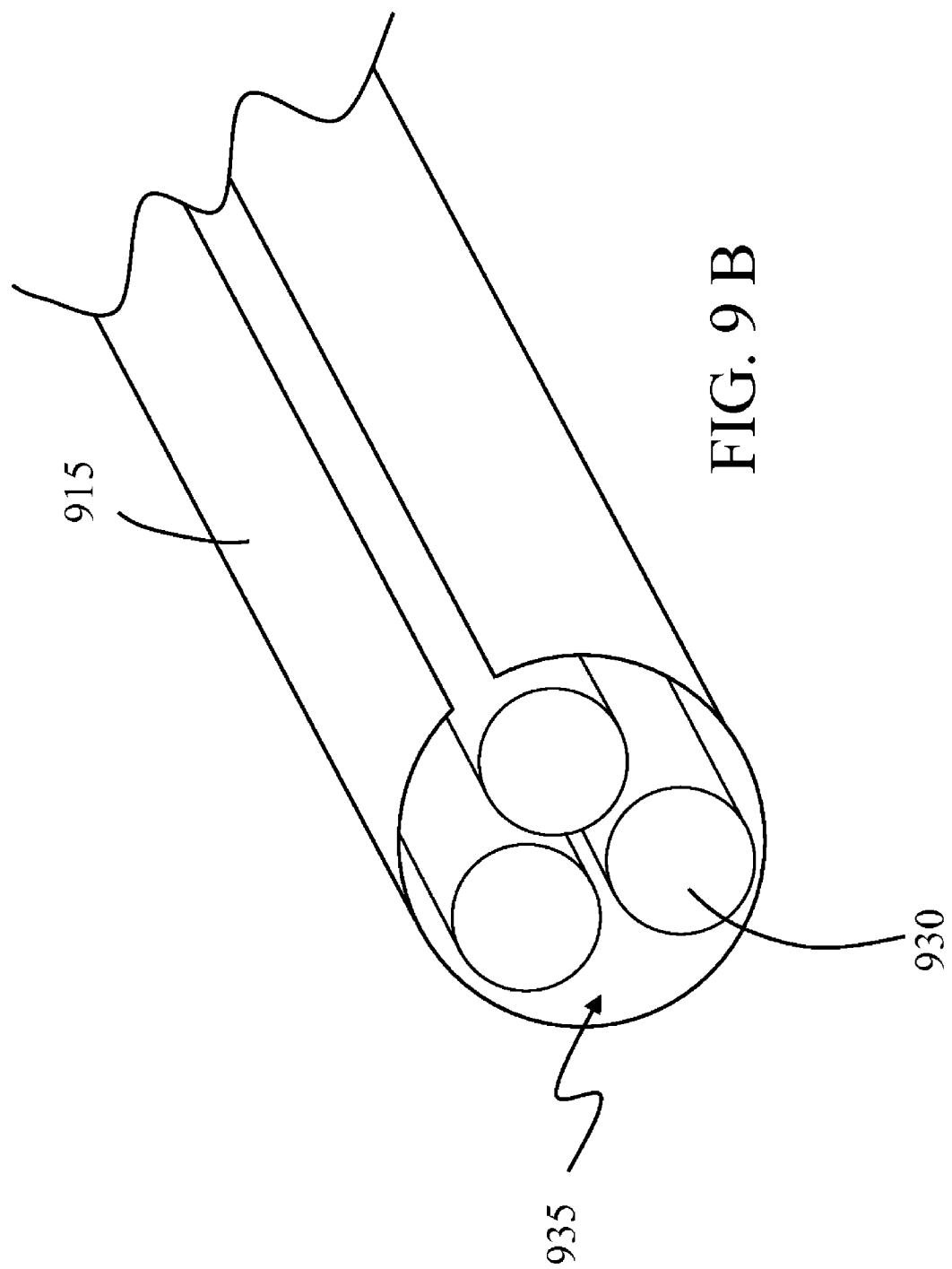
Figure 9C:
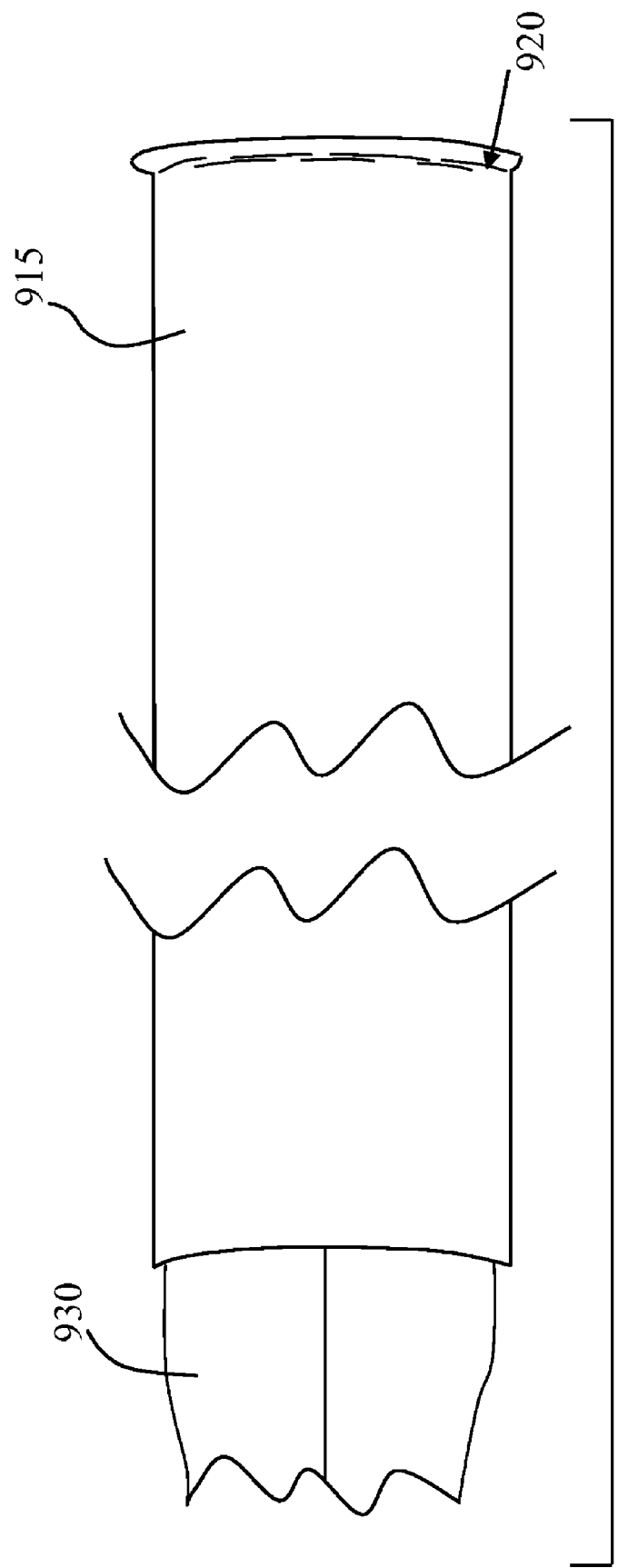
Figure 9D:
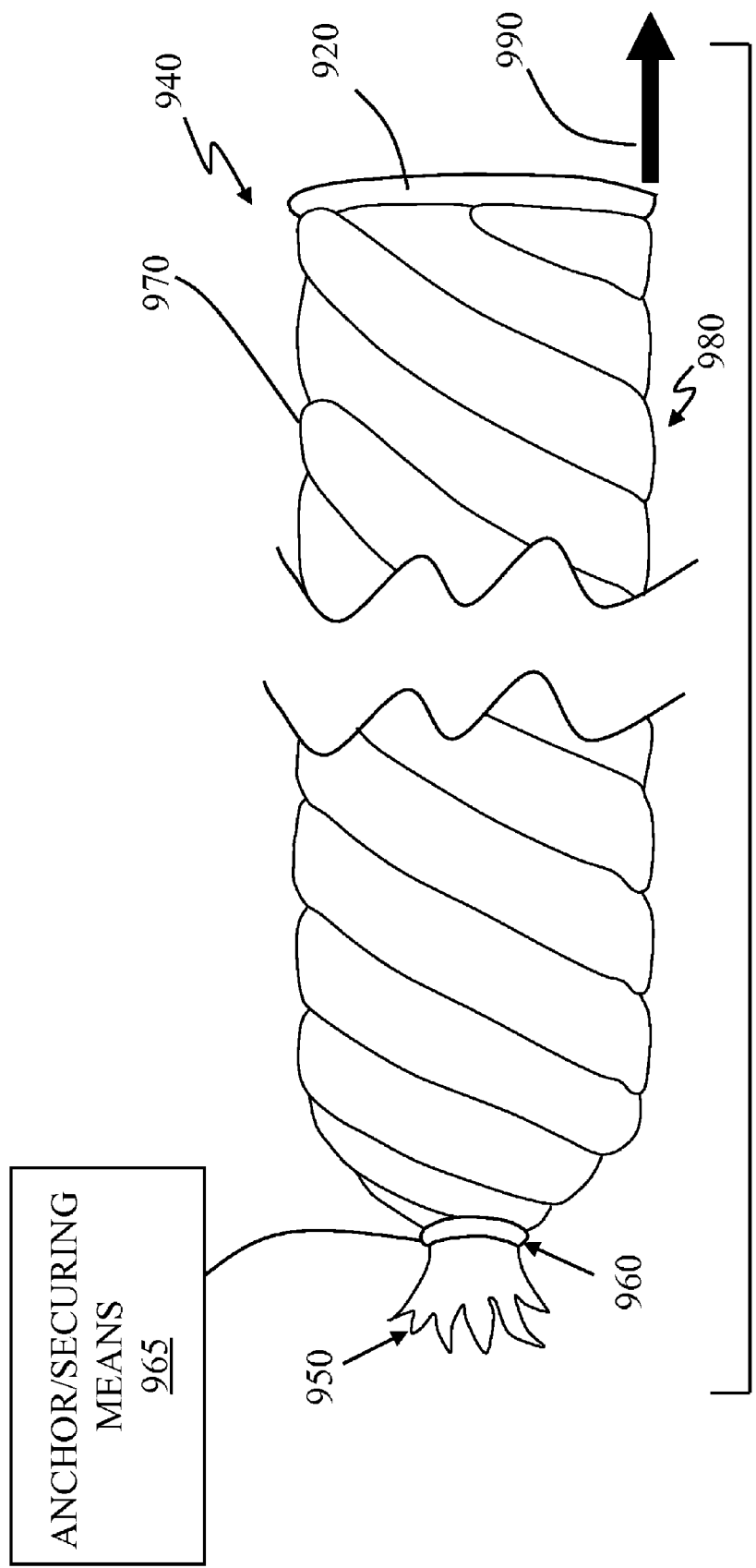

As seen in FIGS. 9A-9D, to make a twisted pet chew treat or product, and in order to position the inner core filling to remain within, e.g., about the centerline of a cylindrical product embodiment, a cylindrical sheath 915 may be used as a positioning article as seen in FIG. 9A. The sheath 915 may be made from malleable, light gauge, stainless spring steel. A manufacturing embodiment of the sheath may be an approximately four foot long substantial tubular article 900 having an inner dimension of ⅝-inch with an ⅛-inch aperture, slit or open seam running along the length of the article 910. A proximal end of the stainless spring steel has been rolled to create a small lip for handling the sheath 920. Four foot long rope-like sections of extrusion 930, i.e., one or more inner fill cords 930 may be placed inside the sheath 915 as seen in FIGS. 9B and 9C. The sheath may then be over-wrapped with rehydrated hide 970 using a twisting technique 980. When the entire sheath has been wrapped 940, e.g., using a twisting application 980 of hide, the distal end 950 of the hide/inner filling is secured. The distal end 950 may be secured via a clasp 960 that gathers together the hide, e.g., a portion of a strip of wrapped hide, and the inner fill 935, e.g., a portion of the inner fill cord 930, that extends beyond the length of the sheath and the clasped portion may be further secured by anchoring the clasp as seen in FIG. 9D. The sheath may then be removed 990 from being interposed between the hide and the inner filling 935, via, for example, pulling from the proximal end. Accordingly, the anchoring 965 of the clap and securing of the extending elements of the chew must be sufficient to withstand the forces applied when the sheath is removed or laterally withdrawn from the assembly. Once the sheath is removed, the resulting article is a twisted hide product with a centered inner filling. Thereafter, the assembled pet chew comprising one or more inner fill cords having one or more rehydrated hide, e.g. porkhide, strips disposed about them may be dried for shelf storage and shipping.

Various details of the exemplary embodiments of the animal chew toy article and process of manufacture may be changed without departing from the claim scope. That is, alterations and modifications may be made by those having ordinary skill in the art without departing from the spirit and scope of the invention. Furthermore, the foregoing description of the preferred embodiment of the invention and best mode for practicing the invention are provided for the purpose of illustration and not for the purpose of limitation. Therefore, it must be understood that the illustrated preferred and alternative embodiments have been set forth only for the purposes of example and that these exemplary embodiments should not be taken as limiting the invention as defined by the following claims.

I claim:

1. A method of pet chew manufacture comprising:
rehydrating dried hide;
providing a sheath of the dried hide having a proximal end and a distal end;
inserting one or more inner fill cords into the sheath, wherein the inserted one or more inner fill cords extend beyond the distal end of the;
wrapping one or more strips of rehydrated hide about the sheath, wherein the wrapped one or more strips of rehydrated hide extend beyond the distal end of the;
securing a portion of the one or more inner fill cords extending beyond the distal end of the with a portion of the wrapped one or more strips of rehydrated hide extending beyond the distal end of the as an assembly; and
withdrawing, at the proximal end of the sheath, the sheath from the assembly of one or more inner fill cords and one more strips of rehydrated hide.

2. The method of claim 1 wherein the rehydration is steam rehydration.

* * * * *

UNITED STATES PATENT AND TRADEMARK OFFICE
CERTIFICATE OF CORRECTION

PATENT NO. : 7,976,884 B2  
APPLICATION NO. : 12/206149  
DATED : July 12, 2011  
INVENTOR(S) : Christopher Alan Weinberg Page 1 of 1

It is certified that error appears in the above-identified patent and that said Letters Patent is hereby corrected as shown below:

Claim 1, line 44 and line 47, the word --sheath-- is inserted before the ";"

Signed and Sealed this  
Thirteenth Day of November, 2012

David J. Kappos  
*Director of the United States Patent and Trademark Office*

UNITED STATES PATENT AND TRADEMARK OFFICE
CERTIFICATE OF CORRECTION

| | | |
|---|---|---|
| PATENT NO. | : 7,976,884 B2 | Page 1 of 1 |
| APPLICATION NO. | : 12/206149 | |
| DATED | : July 12, 2011 | |
| INVENTOR(S) | : Christopher Alan Weinberg | |

It is certified that error appears in the above-identified patent and that said Letters Patent is hereby corrected as shown below:

Claim 1, Column 8, line 44 and line 47, the word --sheath-- is inserted before the ";"

This certificate supersedes the Certificate of Correction issued November 13, 2012.

Signed and Sealed this
Eleventh Day of December, 2012

David J. Kappos
*Director of the United States Patent and Trademark Office*